United States Patent
Huang (10) Patent No.: US 11,219,045 B2
(45) Date of Patent: Jan. 4, 2022

(54) CHANNEL RESOURCE ALLOCATION METHOD AND COMPUTER READABLE STORAGE MEDIUM AND TERMINAL

(71) Applicant: Beijing Spreadtrum Hi-Tech Communications Technology Co., Ltd., Beijing (CN)

(72) Inventor: Su Huang, Beijing (CN)

(73) Assignee: Beijing Spreadtrum Hi-Tech Communications Tech., Beijing (CN)

( * ) Notice: Subject to any disclaimer, the term of this patent is extended or adjusted under 35 U.S.C. 154(b) by 0 days.

(21) Appl. No.: 16/321,404

(22) PCT Filed: Jan. 22, 2019

(86) PCT No.: PCT/CN2019/072627
§ 371 (c)(1),
(2) Date: Jan. 28, 2019

(87) PCT Pub. No.: WO2019/157912
PCT Pub. Date: Aug. 22, 2019

(65) Prior Publication Data
US 2021/0337562 A1  Oct. 28, 2021

(30) Foreign Application Priority Data
Feb. 13, 2018  (CN) .......................... 201810151220.2

(51) Int. Cl.
*H04W 72/12* (2009.01)
*H04W 72/04* (2009.01)

(52) U.S. Cl.
CPC ..... *H04W 72/1263* (2013.01); *H04W 72/042* (2013.01); *H04W 72/0446* (2013.01); *H04W 72/1289* (2013.01)

(58) Field of Classification Search
CPC .......... H04W 72/1263; H04W 72/042; H04W 72/0446; H04W 72/1289
(Continued)

(56) References Cited

U.S. PATENT DOCUMENTS

| 2012/0275390 A1* | 11/2012 | Korhonen ........... H04W 74/006 370/329 |
| 2015/0131565 A1* | 5/2015 | Nakashima ........... H04L 1/0026 370/329 |

(Continued)

FOREIGN PATENT DOCUMENTS

| CN | 105636223 A | 6/2016 |
| CN | 106161312 A | 11/2016 |

OTHER PUBLICATIONS

Second Office Action issued for Chinese Patent Application No. 201810151220.2.
(Continued)

*Primary Examiner* — Peter G Solinsky (57) ABSTRACT

The present disclosure describes a method including accessing a cell operating in an unlicensed spectrum and configuring at least one physical shared channel in the cell; indicating, by DCI, the number of slots scheduled for a current physical shared channel if the number of aggregated slots for the at least one physical shared channel configured by RRC signaling is greater than 1; and indicating, by the DCI, at least one piece of time-domain resource allocation information. The time-domain resource allocation information includes: an offset value between a slot where the physical shared channel is located and a slot where a physical downlink control channel is transmitted; a starting symbol position of the physical shared channel; length information of symbols of the physical shared channel; and a mapping type of the physical shared channel.

19 Claims, 3 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0150524 A1 | 5/2017 | Oh et al. | |
| 2017/0332379 A1 | 11/2017 | Wang et al. | |
| 2018/0262304 A1* | 9/2018 | Wang | H04W 72/1278 |
| 2019/0082431 A1* | 3/2019 | Yi | H04L 5/0055 |
| 2019/0200355 A1* | 6/2019 | Baldemair | H04W 72/0453 |
| 2020/0067676 A1* | 2/2020 | Yi | H04L 1/0013 |
| 2021/0058940 A1* | 2/2021 | Choi | H04L 5/00 |

OTHER PUBLICATIONS

First Office Action issued for Chinese Patent Application No. 201810151220.2.
International Search report for International Application No. PCT/CN2019/072627, dated Apr. 18, 2019.

* cited by examiner

FIG. 1

| Identifier | Slot | Starting symbol position | Length of symbols | Mapping type |
|---|---|---|---|---|
| 0 | | | | |
| 1 | | | | |
| 2 | | | | |
| ... | | | | |

CHANNEL RESOURCE ALLOCATION METHOD AND COMPUTER READABLE STORAGE MEDIUM AND TERMINAL

CROSS-REFERENCE

This application is a U.S. national stage application of the PCT International Application No. PCT/CN2019/072627 filed on Jan. 22, 2019, which claims the benefit of foreign priority of Chinese patent application No. 201810151220.2 filed on Feb. 13, 2018, the contents all of which are incorporated herein by reference.

TECHNICAL FIELD

Embodiments of the present disclosure relate to the field of mobile communications, and in particular, to a method for allocating channel resource, a computer readable storage medium, and a terminal.

BACKGROUND

The 3GPP standard organization is studying on the deployment of the New Radio (NR) system in an unlicensed spectrum, for the purpose of an efficient and fair usage of the unlicensed spectrum and an improved data transmitting rate of the NR system. There are three ways for the NR system to use the unlicensed spectrum. The first way is to use an NR cell operating in the unlicensed spectrum as a main cell; the second way is to have a User Equipment (UE) accessing an NR cell operating in the unlicensed spectrum via a Long Term Evaluation (LTE) cell; and the last way is to have a UE accessing an NR cell operating in the unlicensed spectrum via another NR cell. In the latter two ways the licensed spectrum and the unlicensed spectrum can be used in combination in a manner similar to carrier aggregation, that is, a terminal and an evolved node B (gNB) may work in both the licensed spectrum and the unlicensed spectrum.

However, when the cell operating in the unlicensed spectrum transmits Physical Uplink Shared Channels (PUSCHs) or Physical Downlink Shared Channels (PDSCHs) with a plurality of slots aggregated, not the whole slots are used for transmission; if the starting symbol position and length of symbols of the PUSCH/PDSCH are still used, this may not be suitable for a transmission by the cell operating in the unlicensed spectrum, because upon a successful access to the cell operating in the unlicensed spectrum, this transmitting slot should be occupied as much as possible, or else the remaining spectrum at the transmitting slot will be occupied by other devices. Therefore, there is a need for a new method for channel resource allocation for PUSCH/PDSCH transmissions over the cell operating in the unlicensed spectrum.

SUMMARY

The present disclosure aims to solve the problem about how to occupy a transmitting slot as much as possible after a successfully access to the cell operating in the unlicensed spectrum, to prevent the remaining spectrum in this transmitting slot being occupied by other devices.

In order to solve the aforementioned problem, an embodiment of the present disclosure provides a method for allocating channel resource. The method includes: accessing a cell operating in an unlicensed spectrum and configuring at least one physical shared channel in the cell; indicating, by Downlink Control Information (DCI), the number of slots scheduled for a current physical shared channel in response to that the number of aggregated slots for the at least one physical shared channel configured by Radio Resource Control (RRC) signaling is greater than 1; and indicating, by the DCI, at least one piece of time-domain resource allocation information. The time-domain resource allocation information includes: an offset value between a slot where the physical shared channel is located and a slot where a physical downlink control channel is transmitted; a starting symbol position of the physical shared channel; length information of symbols of the physical shared channel; and a mapping type of the physical shared channel. The mapping type of the physical shared channel includes type A and type B.

Alternatively, the starting symbol position of the physical shared channel indicates a starting position from which a first physical shared channel is transmitted in a slot. The length information of symbols of the physical shared channel includes an indication of a transmission length within which a last physical shared channel is transmitted in a slot.

Alternatively, the method further includes: configuring starting symbol positions in the slots of other physical shared channels than the first physical shared channel and the last physical shared channel, in accordance with the starting symbol position of the physical shared channel and the length information of symbols of the physical shared channel. The whole slots are occupied by the symbols of the other physical shared channels.

Alternatively, indicating the at least one piece of time-domain resource allocation information further includes: in one piece of time-domain resource allocation information, configuring, by RRC indication, that the transmissions of the first physical shared channel and the last physical shared channel employ configuration of type A or type B, and that the transmissions of other physical shared channels employ configuration of type A.

Alternatively, indicating the at least one piece of time-domain resource allocation information further includes: in one piece of time-domain resource allocation information, configuring, by RRC indication, that the transmission of the first physical shared channel employs a first type A or type B, that the transmission of the last physical shared channel employs a second type A or type B, and that the transmissions of other physical shared channels employ a third type A or type B.

Alternatively, indicating the at least one piece of time-domain resource allocation information further includes: in one piece of time-domain resource allocation information, providing, by RRC indication, one piece of information of type A or one piece of information of type B, and configuring that the transmissions of all the physical shared channels employ a specified type.

Alternatively, indicating the at least one piece of time-domain resource allocation information further includes: indicating that one piece of time-domain resource allocation information is provided respectively for the first physical shared channel and the last physical shared channel.

Alternatively, the piece of time-domain resource allocation information for the first physical shared channel includes: an offset value between a slot where the first physical shared channel is transmitted and a slot where the physical downlink control channel is transmitted; a starting symbol position of the first physical shared channel; length information of symbols of the first physical shared channel; and a mapping type of the first physical shared channel. The piece of time-domain resource allocation information for the last physical shared channel includes: an offset value between the slot where the last physical shared channel is transmitted and the slot where the physical downlink control channel is transmitted; a starting symbol position of the last physical shared channel; length information of symbols of the last physical shared channel; and a mapping type of the last physical shared channel.

Alternatively, the physical shared channel includes a Physical Uplink Shared Channel (PUSCH) or a Physical Downlink Shared Channel (PDSCH).

In an embodiment of the present disclosure, there is also provided a non-transitory computer readable storage medium storing computer instructions that, when being executed, perform the steps of any one of the methods in the above embodiments.

In an embodiment of the present disclosure, there is also provided a terminal, comprising a memory and a processor, wherein the memory stores computer instructions executable on the processor, and the processor, when executing the computer instructions, performs the steps of any one of the methods in the above embodiments.

Compared with the prior art, the technical solutions in embodiments of the present disclosure have the following advantages.

The method for allocating channel resource according to the present disclosure enables, after a successful accession of a cell operating in an unlicensed spectrum, one transmitting slot to be occupied as much as possible, and have flexible starting and end symbol positions to avoid idle slot being occupied by other devices, resulting in mutual interference among signals from different devices.

Further, the computer readable storage medium according to the present disclosure enables, after a successful accession of the cell operating in the unlicensed spectrum, one transmitting slot to be occupied as much as possible, and have flexible starting and end symbol positions.

Furthermore, the terminal according to the present disclosure enables, after a successful accession of the cell operating in the unlicensed spectrum, one transmitting slot to be occupied as much as possible, and have flexible starting and end symbol positions.

DETAILED DESCRIPTION

Figure 1:
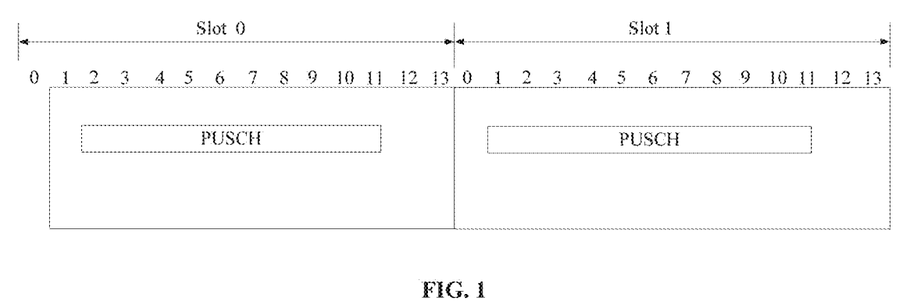
FIG. 1 is a structural diagram of a frame of a 3GPP NR system.

As shown in FIG. 1, there is shown a structural diagram of a frame of a 3GPP NR system. Each radio frame with a length of 10 ms in time is divided into 10 subframes of the same length of 1 ms. In the frequency domain, due to different types of subcarrier spacing, in the time domain each subframe may include a plurality of slots. Each slot consists of a certain number of symbols, which is determined by the type of cyclic prefix (CP).

Each slot in FIG. 1 contains 14 symbols, wherein the identifier of the first symbol is 0, the identifier of the second symbol is 1, and so on.

In order to utilize the unlicensed spectrum fairly and efficiently and to increase the data transmission rate of the NR system, a deployment scheme for the NR network in the unlicensed spectrum is needed.

There are three ways for the NR system to use the unlicensed spectrum. The first way is to use an NR cell operating in the unlicensed spectrum as a main cell; the second way is to have a UE accessing an NR cell operating in the unlicensed spectrum via an LTE cell; and the third way is to have a UE accessing an NR cell operating in the unlicensed spectrum via another NR cell. In the second and the third ways the licensed spectrum and the unlicensed spectrum can be used in combination in a manner similar to carrier aggregation, that is, a terminal and a gNB may work in both the licensed spectrums and the unlicensed spectrum.

The 3GPP can achieve the coexistence of LTE licensed assisted access (LTE LAA) systems from different operators in the unlicensed spectrum with other systems by using a listen-before-talk (LBT) process. The LBT process refers to that, in the unlicensed spectrum, the node determines whether the current channel is available through a clear channel assessment (CCA) prior to data transmission. Therefore, all the LBT processes include energy detection for determining if the channel is occupied. An energy detection threshold may be specified in some regional regulations, where the channel is considered busy if the energy received by the node is higher than the energy detection threshold. The downlink input of the LTE LAA supports two channel access processes, i.e., Type 1 and Type 2, wherein Type 1 is a Cat 4-based channel access process, and Type 2 is a channel access process based on a fixed time duration (at least 25 μs LBT exists prior to transmission). Also, the uplink transmission of LAA supports these two channel access processes as well, which are also referred to as Type 1 and Type 2, respectively.

Time-domain resource allocation for the PUSCH/PDSCH in the NR is as follows: the radio resource control (RRC) can assign 16 types of time-domain resource allocation information via high-layer signalling, and the downlink control information (DCI) indicates, with 4 bits, which type of time-domain resource allocation information is used by the current scheduling.

However, as described above, when the cell operating in the unlicensed spectrum transmits a PUSCH/PDSCH with a plurality of slots aggregated, not the whole slots are used for transmission; if the starting symbol position and length information of symbols of the PUSCH/PDSCH is still used, this transmitting slot cannot be fully occupied, so that the remaining spectrum in this transmitting slot will be occupied by other devices, and the signals between different devices may interfere with each other, which affects the communication quality.

Embodiments of the present disclosure will be detailed below in conjunction with the accompanying drawings so that the above objectives, features and advantages of the present disclosure are more lucid.

In some embodiments of the present disclosure, there is provided a method for channel resource allocation, comprising: accessing a cell operating in an unlicensed spectrum and configuring at least one physical shared channel in the cell; indicating, by Downlink Control Information (DCI), the number of slots scheduled for a current physical shared channel if the number of aggregated slots for the at least one physical shared channel configured by Radio Resource Control (RRC) signaling is greater than 1; and indicating, by the DCI, at least one piece of time-domain resource allocation information. The time-domain resource allocation information includes: an offset value between a slot where the physical shared channel is located and a slot where a physical downlink control channel is transmitted; a starting symbol position of the physical shared channel; length information of symbols of the physical shared channel; and a mapping type of the physical shared channel. The mapping type of the physical shared channel includes type A and type B.

In specific implements, the physical shared channel may be a physical shared channel used in the cell operating in the unlicensed spectrum.

It should be noted that the length information of symbols as mentioned above, is used to describe a length of symbols of a physical shared channel, and the length of symbols is measured in the number of symbols. For example, if the number of symbols is 1, the length of symbols is 1; if the number of symbols is 3, the length of symbols is 3. It can be understandable that the length of symbols is definitely an integer. The length of symbols mentioned in the embodiments hereafter has the same meaning, and therefore will not be detailed again.

It should be noted that the time-domain resource allocation information herein includes three parts: the first part is an offset value between a slot where the physical shared channel is transmitted and a slot where the PDCCH is transmitted; the second part indicates a starting symbol position and length information of symbols; and the third part indicates the mapping type (type A or type B) of the physical shared channel. The RRC also needs to configure the slot aggregation information, which may be (1, 2, 4, 8), i.e., the number of the aggregated slots may be 1, 2, 4, or 8. When the number in the slot aggregation information is greater than 1, both of the starting positions and the lengths are identical for the physical shared channels in each slot, that is, if the starting position for a PDSCH is the first symbol in slot 0, the starting position for another PDSCH in slot 1 is the first symbol in slot 1.

Figure 2:
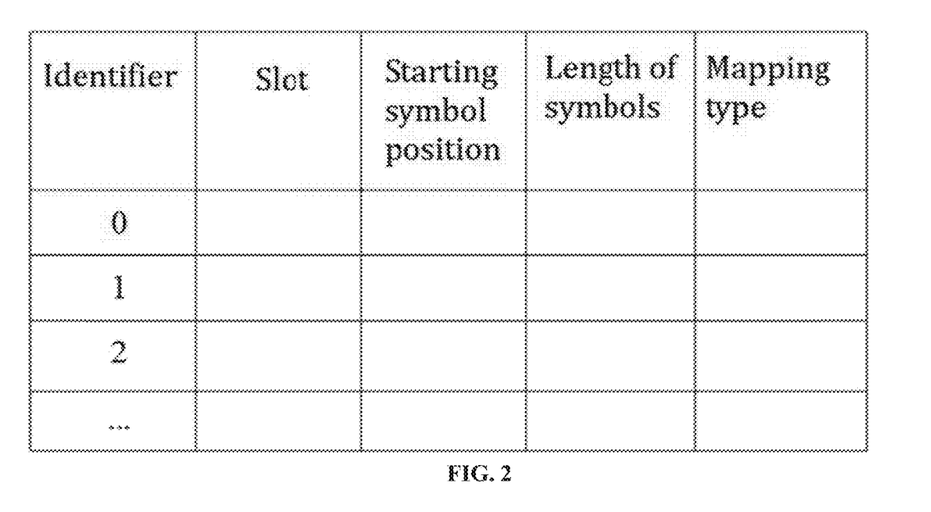
FIG. 2 is a diagram of configuration formats of time-domain resource allocation information.

When the DCI indicates the time-domain resource allocation information, the configuration formats of the time-domain resource allocation information is as shown in FIG. 2. FIG. 2 is a diagram of configuration formats of time-domain resource allocation information. In FIG. 2, the identifiers refer to identifiers for different types of time-domain resource allocation information. As described above, 16 types of time-domain resource allocation information can be assigned, and content in the time-domain resource allocation information may be selected as needed. One can readily understand that these identifiers for the time-domain resource allocation information are diverse from one another.

In FIG. 2, the slot refers to the position of slot where the PDSCH/PUSCH is located.

It is noted that the PDSCH or PUSCH has a different type A or type B from each other.

Specifically, the starting symbol position of a PDSCH of type A may be 0, 1, 2, or 3; the length of symbols may range from X1 to 14, where the value of X1 may be selected as needed.

The starting symbol position of a PDSCH of type B may be any one of 0 through 12, and the length of symbols may be 2, 4, or 7.

The starting symbol position of a PUSCH of type A may be 0; the length of symbols may range from Y1 to 14, where the value of Y1 may be selected as needed.

The starting symbol position of a PUSCH of type B may be any one of 0 through 13, and the length of symbols may be any number of 1 through 14.

It should be noted that a PDSCH or PUSCH of type A or type B also has a distinctive mapping position in the Demodulation Reference Signal (DMRS).

The channel resource allocation method according to the present disclosure enables, after a successful accession of the cell operating in the unlicensed spectrum, one transmitting slot to be occupied as much as possible, and have flexible starting and end symbol positions to avoid idle slot being occupied by other devices, resulting in mutual interference among signals from different devices.

In some embodiments of the present disclosure, the starting symbol position of physical shared channel indicates a starting position from which a first physical shared channel is transmitted in a slot; the length information of symbols of the physical shared channel includes an indication of a transmission length within which a last physical shared channel is transmitted in the slot, and the symbols of the other physical shared channels occupy the whole slots. In an embodiment, alternatively the symbols of all physical shared channels occupy the whole slots.

In specific implements, starting symbol positions of other physical shared channels than the first and the last physical shared channels in a slot are configured in accordance with the starting symbol position and length information of symbols of the physical shared channel.

As noted above, a starting position from which the transmission of the first physical shared channel starts in a slot can be acquired from the starting symbol position of the physical shared channel, and the transmission length in the slot of the last physical shared channel can be acquired from the length information of the symbols of the physical shared channel, so starting symbol positions of other physical shared channels for the transmissions in a slot can be configured according to the starting symbol position and the length information of symbols of the physical shared channel.

For instance, the starting symbol position can be identified as m, and the length of symbols can be L, where m and L are both positive integers.

The starting symbol position m is used to indicate that the starting position, from which the first physical shared channel is transmitted in the slot, is the symbol m. If the number of symbols in the slot where the first physical shared channel is located is $N_{sym}$, the length of the symbols of the first physical shared channel is $N_{sym}$-m.

The length of symbols L is used to indicate that, the starting position of the last physical shared channel for transmission in the slot is the position where the symbol 0 is located, and the length of symbols is L.

The starting symbol positions of other physical shared channels than the first and the last physical shared channels are the positions where the symbol 0 is located in the slots therefor, and the length of symbols are $N_{sym}$. The symbols of the other physical shared channels occupy the entire slots.

Figure 3:
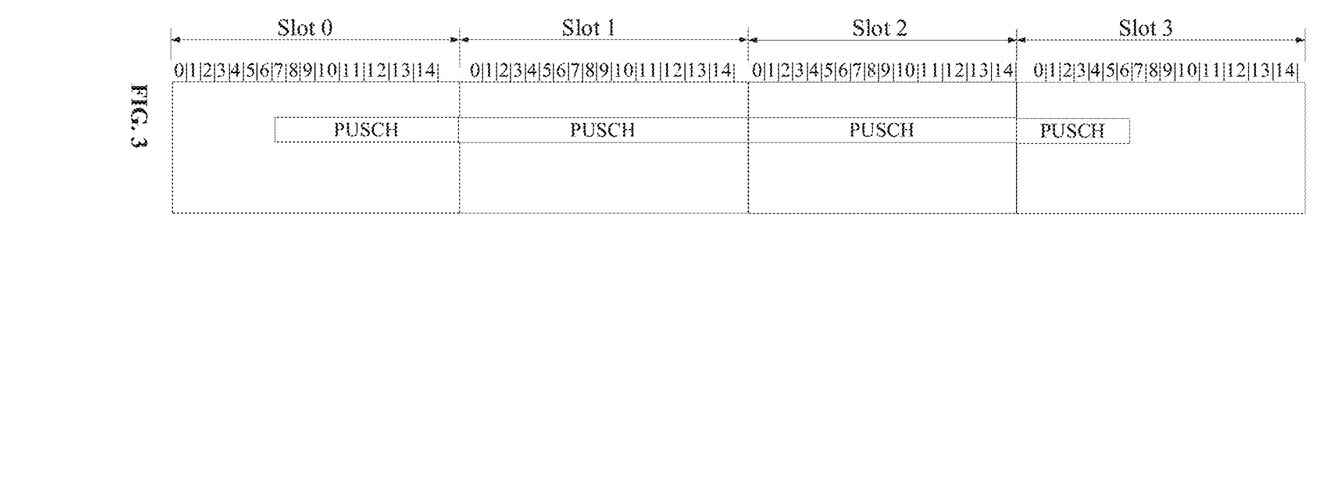
FIG. 3 is a structural diagram of a frame according to an embodiment of the present disclosure.

For example, as shown in FIG. 3, FIG. 3 is a structural diagram of a frame according to an embodiment of the present disclosure. If the starting symbol position is 7 and the length of the symbols is 7, the starting position for the first physical shared channel for transmission in its slot is symbol 7. If the number of symbols in the slot, where the first physical shared channel is located, is 14, the length of symbols of the first physical shared channel is 14−7=7. When the length of symbols is 7, the starting position for the last physical shared channel for transmission in its slot is the position where symbol 0 is located, and the end position is the position where symbol 6 is located. The starting positions for other physical shared channels are the positions where symbol 0 is located, and lengths of symbols thereof are 14.

It should be noted that "symbol 0" here refers to a symbol whose identifier is 0, which the first symbol rather the 0th symbol. One of skill in the art will readily understand the symbol positions indicated by symbol identifiers.

This method enables, after a successful accession of a cell operating in an unlicensed spectrum, one transmitting slot to be occupied as much as possible, and have flexible starting and end symbol positions to avoid idle slot being occupied by other devices, resulting in mutual interference among signals from different devices.

In specific implements, indicating at least one piece of time-domain resource allocation information comprises: in one piece of time-domain resource allocation information, configuring, by RRC indication, that the transmissions of the first physical shared channel and the last physical shared channel employ configuration of type A or type B, and that the transmissions of other physical shared channels employ configuration of type A.

In specific implements, indicating the time-domain resource allocation information further comprises: in one piece of time-domain resource allocation information, configuring, by RRC indication, that the transmission of the first physical shared channel employs a first type A or type B, that the transmission of the last physical shared channel employs a second type A or type B, and that the transmissions of other physical shared channels employ a third type A or type B.

In specific implements, indicating at least one piece of time-domain resource allocation information further comprises: in one piece of time-domain resource allocation information, providing, by RRC indication, one piece of information of type A or one piece of information of type B, and configuring that the transmissions of all the physical shared channels employ a specified type.

As only one piece of time-domain resource allocation information is used, system resources are saved and the processing speed of the system is increased.

The channel resource allocation method according to the present disclosure enables, after a successful accession of a cell operating in an unlicensed spectrum, one transmitting slot to be occupied as much as possible, and have flexible starting and end symbol positions to avoid idle slot being occupied by other devices, resulting in mutual interference among signals from different devices.

In some embodiments of the present disclosure, indicating the time-domain resource allocation information comprises: indicating that one piece of time-domain resource allocation information is provided respectively for the first physical shared channel and the last physical shared channel.

In specific implements, the piece of time-domain resource allocation information for the first physical shared channel includes an offset value between a slot where the first physical shared channel is transmitted and a slot where the physical downlink control channel is transmitted, a starting symbol position of the first physical shared channel, length information of symbols of the first physical shared channel, and a mapping type of the first physical shared channel. The piece of time-domain resource allocation information for the last physical shared channel includes a offset value between a slot where the last physical shared channel is transmitted and a slot where a physical downlink control channel is transmitted, a starting symbol position of the last physical shared channel, length information of symbols of the last physical shared channel, and a mapping type of the last physical shared channel.

It should be noted that notwithstanding that indicated are only time-domain resource allocation information for the first physical shared channel transmission and the last physical shared channel transmission, the mapping types used for other physical shared channel transmission are defaulted as type A according to the RRC protocol, so their time-domain resource allocation information is not necessarily indicated.

The channel resource allocation method according to the present disclosure enables, after a successful accession of a cell operating in an unlicensed spectrum, one transmitting slot to be occupied as much as possible, and have flexible starting and end symbol positions to avoid idle slot being occupied by other devices, resulting in mutual interference among signals from different devices.

In some embodiments of the present disclosure, the physical shared channel includes PUSCH or PDSCH.

In some embodiments of the present disclosure, there is also provided a computer readable storage medium storing computer instructions that, when being executed, perform the steps of any one of the methods for allocating channel resource in the above embodiments.

The computer readable storage medium according to the present disclosure enables, after a successful accession of a cell operating in an unlicensed spectrum, one transmitting slot to be occupied as much as possible, and have flexible starting and end symbol positions to avoid idle slot being occupied by other devices, resulting in mutual interference among signals from different devices.

In some embodiments of the present disclosure, there is also provided a terminal, comprising a memory and a processor, wherein the memory stores computer instructions executable on the processor, and the processor, when executing the computer instructions, performs the steps of any one of the methods for allocating channel resource in the above embodiments.

The terminal according to the present disclosure enables, after a successful accession of a cell operating in an unlicensed spectrum, one transmitting slot to be occupied as much as possible, and have flexible starting and end symbol positions to avoid idle slot being occupied by other devices, resulting in mutual interference among signals from different devices.

One of ordinary skill in the art can understand that all or part of the steps in the various methods of the above embodiments can be implemented by hardware under instructions from program, and the program can be stored in a computer readable storage medium including ROM, RAM, magnetic discs, or optical discs.

Although the present disclosure has been disclosed as above, it is not limited thereto. Various variations and modifications may occur to one of skill in the art without departing from the scopes and spirits of the present disclosure. Therefore, the protection scope of the present disclosure is subject to the scope defined by the claims.

What is claimed is:

1. A method for allocating channel resource, comprising:
  accessing a cell operating in an unlicensed spectrum and configuring at least one physical shared channel in the cell;
  indicating, by Downlink Control Information (DCI), the number of slots scheduled for a current physical shared channel in response to that the number of aggregated slots for the at least one physical shared channel configured by Radio Resource Control (RRC) signaling is greater than 1; and
  indicating, by the DCI, at least one piece of time-domain resource allocation information,
  wherein the time-domain resource allocation information includes:

an offset value between a slot where the physical shared channel is located and a slot where a physical downlink control channel is transmitted;
a starting symbol position of the physical shared channel;
length information of symbols of the physical shared channel; and
a mapping type of the physical shared channel, and
the mapping type of the physical shared channel includes type A and type B.

2. The method according to claim 1, wherein the starting symbol position of the physical shared channel indicates a starting position from which a first physical shared channel is transmitted in a slot, and the length information of symbols of the physical shared channel includes an indication of a transmission length within which a last physical shared channel is transmitted in a slot.

3. The method according to claim 2, further comprising:
configuring starting symbol positions in the slots of other physical shared channels than the first physical shared channel and the last physical shared channel, in accordance with the starting symbol position of the physical shared channel and the length information of symbols of the physical shared channel,
wherein the whole slots are occupied by the symbols of the other physical shared channels.

4. The method according to claim 2, wherein said indicating, by the DCI, the at least one piece of time-domain resource allocation information further comprises:
in one piece of time-domain resource allocation information, configuring, by RRC indication, that the transmissions of the first physical shared channel and the last physical shared channel employ configuration of type A or type B, and that the transmissions of other physical shared channels employ configuration of type A.

5. The method according to claim 2, wherein said indicating, by the DCI, the at least one piece of time-domain resource allocation information further comprises:
in one piece of time-domain resource allocation information, configuring, by RRC indication, that the transmission of the first physical shared channel employs a first type A or type B, that the transmission of the last physical shared channel employs a second type A or type B, and that the transmissions of other physical shared channels employ a third type A or type B.

6. The method according to claim 2, wherein said indicating, by the DCI, the at least one piece of time-domain resource allocation information further comprises:
in one piece of time-domain resource allocation information, providing, by RRC indication, one piece of information of type A or one piece of information of type B, and configuring that the transmissions of all the physical shared channels employ a specified type.

7. The method according to claim 2, wherein said indicating, by the DCI, the at least one piece of time-domain resource allocation information further comprises:
indicating that one piece of time-domain resource allocation information is provided respectively for the first physical shared channel and the last physical shared channel.

8. The method according to claim 7, wherein
the piece of time-domain resource allocation information for the first physical shared channel includes:
an offset value between a slot where the first physical shared channel is transmitted and a slot where the physical downlink control channel is transmitted;
a starting symbol position of the first physical shared channel;
length information of symbols of the first physical shared channel; and
a mapping type of the first physical shared channel,
the piece of time-domain resource allocation information for the last physical shared channel includes:
an offset value between the slot where the last physical shared channel is transmitted and the slot where the physical downlink control channel is transmitted;
a starting symbol position of the last physical shared channel;
length information of symbols of the last physical shared channel; and
a mapping type of the last physical shared channel.

9. The method according to claim 1, wherein the physical shared channel includes a Physical Uplink Shared Channel (PUSCH) or a Physical Downlink Shared Channel (PDSCH).

10. A non-transitory computer readable storage medium storing computer instructions that cause a processor to:
access a cell operating in an unlicensed spectrum and configuring at least one physical shared channel in the cell;
indicate, by Downlink Control Information (DCI), the number of slots scheduled for a current physical shared channel in response to that the number of aggregated slots for the at least one physical shared channel configured by Radio Resource Control (RRC) signaling is greater than 1; and
indicate, by the DCI, at least one piece of time-domain resource allocation information,
wherein the time-domain resource allocation information includes:
an offset value between a slot where the physical shared channel is located and a slot where a physical downlink control channel is transmitted;
a starting symbol position of the physical shared channel;
length information of symbols of the physical shared channel; and
a mapping type of the physical shared channel, and
the mapping type of the physical shared channel includes type A and type B.

11. The non-transitory computer readable storage medium according to claim 10, wherein the starting symbol position of the physical shared channel indicates a starting position from which a first physical shared channel is transmitted in a slot, and the length information of symbols of the physical shared channel includes an indication of a transmission length within which a last physical shared channel is transmitted in a slot.

12. The non-transitory computer readable storage medium according to claim 11, the computer instructions further cause the processor to:
configure starting symbol positions in the slots of other physical shared channels than the first physical shared channel and the last physical shared channel, in accordance with the starting symbol position of the physical shared channel and the length information of symbols of the physical shared channel,
wherein the whole slots are occupied by the symbols of the other physical shared channels.

13. The non-transitory computer readable storage medium according to claim 11, the computer instructions further cause the processor to:
in one piece of time-domain resource allocation information, configure, by RRC indication, that the transmissions of the first physical shared channel and the last physical shared channel employ configuration of type A or type B, and that the transmissions of other physical shared channels employ configuration of type A.

14. The non-transitory computer readable storage medium according to claim 11, wherein the computer instructions further cause the processor to:
in one piece of time-domain resource allocation information, configure, by RRC indication, that the transmission of the first physical shared channel employs a first type A or type B, that the transmission of the last physical shared channel employs a second type A or type B, and that the transmissions of other physical shared channels employ a third type A or type B.

15. The non-transitory computer readable storage medium according to claim 11, wherein the computer instructions further cause the processor to:
in one piece of time-domain resource allocation information, provide, by RRC indication, one piece of information of type A or one piece of information of type B, and configuring that the transmissions of all the physical shared channels employ a specified type.

16. The non-transitory computer readable storage medium according to claim 11, wherein the computer instructions further cause the processor to:
indicate that one piece of time-domain resource allocation information is provided respectively for the first physical shared channel and the last physical shared channel.

17. The non-transitory computer readable storage medium according to claim 16, wherein
the piece of time-domain resource allocation information for the first physical shared channel includes:
an offset value between a slot where the first physical shared channel is transmitted and a slot where the physical downlink control channel is transmitted;
a starting symbol position of the first physical shared channel;
length information of symbols of the first physical shared channel; and
a mapping type of the first physical shared channel,
the piece of time-domain resource allocation information for the last physical shared channel includes:
an offset value between the slot where the last physical shared channel is transmitted and the slot where the physical downlink control channel is transmitted;
a starting symbol position of the last physical shared channel;
length information of symbols of the last physical shared channel; and
a mapping type of the last physical shared channel.

18. The non-transitory computer readable storage medium according to claim 10, wherein the physical shared channel includes a Physical Uplink Shared Channel (PUSCH) or a Physical Downlink Shared Channel (PDSCH).

19. A terminal, comprising a memory and a processor, wherein the memory stores computer instructions executable on the processor, and the computer instructions cause the processor to:
access a cell operating in an unlicensed spectrum and configuring at least one physical shared channel in the cell;
indicate, by Downlink Control Information (DCI), the number of slots scheduled for a current physical shared channel in response to that the number of aggregated slots for the at least one physical shared channel configured by Radio Resource Control (RRC) signaling is greater than 1; and
indicate, by the DCI, at least one piece of time-domain resource allocation information,
wherein the time-domain resource allocation information includes:
an offset value between a slot where the physical shared channel is located and a slot where a physical downlink control channel is transmitted;
a starting symbol position of the physical shared channel;
length information of symbols of the physical shared channel; and
a mapping type of the physical shared channel, and
the mapping type of the physical shared channel includes type A and type B.

* * * * *